(12) United States Patent
Liu et al.

(10) Patent No.: US 11,461,344 B2
(45) Date of Patent: Oct. 4, 2022

(54) DATA PROCESSING METHOD AND ELECTRONIC DEVICE

(71) Applicant: NEC CORPORATION, Tokyo (JP)

(72) Inventors: Chunchen Liu, Beijing (CN); Wenjuan Wei, Beijing (CN); Lu Feng, Beijing (CN)

(73) Assignee: NEC CORPORATION, Tokyo (JP)

( * ) Notice: Subject to any disclaimer, the term of this patent is extended or adjusted under 35 U.S.C. 154(b) by 486 days.

(21) Appl. No.: 16/368,382

(22) Filed: Mar. 28, 2019

(65) Prior Publication Data

US 2019/0303368 A1 Oct. 3, 2019

(30) Foreign Application Priority Data

Mar. 29, 2018 (CN) .......................... 201810269835.5

(51) Int. Cl.
*G06F 16/2458* (2019.01)
*G06N 20/00* (2019.01)

(52) U.S. Cl.
CPC ......... *G06F 16/2465* (2019.01); *G06N 20/00* (2019.01)

(58) Field of Classification Search
CPC ..... G06F 16/2465; G06N 20/00; G06N 7/005
See application file for complete search history.

(56) References Cited

U.S. PATENT DOCUMENTS

| 2006/0059112 A1* | 3/2006 | Cheng ................. G06K 9/6296 706/12 |
| 2007/0123773 A1* | 5/2007 | Fuchs ................ G06K 9/00147 600/410 |
| 2007/0203870 A1* | 8/2007 | Saito ....................... G06F 17/10 706/52 |
| 2013/0257873 A1* | 10/2013 | Isozaki ................. G06T 11/206 345/440 |

(Continued)

FOREIGN PATENT DOCUMENTS

| JP | 2005-276225 A | 10/2005 |
| JP | 2014-228991 A | 12/2014 |
| JP | 2015-153133 A | 8/2015 |

OTHER PUBLICATIONS

Communication dated May 12, 2020 from Japanese Patent Office in JP Application No. 2019-063338.

*Primary Examiner* — Cam Y T Truong
(74) *Attorney, Agent, or Firm* — Sughrue Mion, PLLC

(57) ABSTRACT

Embodiments of the present disclosure provide a data processing method, an electronic device and a computer-readable storage medium. The data processing method comprises: obtaining a model representing causal relations among a plurality of variables based on a set of observation data of the plurality of variables; determining, based on the obtained model, a first and a second variables having direct causal relation in the plurality of variables; determining whether the first and second variables are independent from each other; and in response to the first and second variables (Continued)

being independent from each other, deleting the direct causal relation between the first and second variables from the obtained model. With the data processing method of the present disclosure, pseudo-causes can be removed effectively so that causal relations among a plurality of variables can be represented more accurately.

20 Claims, 5 Drawing Sheets

(56) References Cited

U.S. PATENT DOCUMENTS

| | | | | |
|---|---|---|---|---|
| 2015/0363702 | A1* | 12/2015 | Baum | G06N 5/048 706/52 |
| 2017/0090889 | A1* | 3/2017 | Hale | G06F 8/433 |
| 2017/0308836 | A1* | 10/2017 | Kass | G06N 20/00 |

* cited by examiner

DATA PROCESSING METHOD AND ELECTRONIC DEVICE

FIELD

Embodiments of the present disclosure relate to the field of data mining and machine learning, and more specifically, to a data processing method, an electronic device and a computer-readable storage medium for determining causal relations among a plurality of variables.

BACKGROUND

With rapid development of information technology, data is growing in scale. In the era of big data, a large amount of data may be obtained through various data collection approaches. Lots of useful information may be obtained by performing data analyzing and mining to such data. However, in various application fields, only the appearance or running performance of the system can be observed while it is hard to have an insight into the complex mechanism and process of actions behind the system and only empirical understanding can be obtained.

Causal relation learning is aimed at restoring complex mechanism of actions behind the system automatically with a computer and reproducing a data generation process based on observation data of the system. Currently, causal relation learning has been applied to various fields, such as market analysis, pharmacy, manufacturing and so on to have an insight into nature of the system and further guide decision-making. For example, in the field of product retail, when there is decline in product sales, causal relation learning technology is able to find the cause of sales decline by analyzing sales-related data, thereby helping merchants with improving sales. For another example, in the field of health care, causal relation learning technology is able to help health care centers by analyzing root causes of their customers' churn and assist in the development of their customer retention scheme. For another example, in the field of software development, causal relation learning technology can support timely prediction on whether project under developing has risks of delays and low quality etc., and locate the causes of the risks so as to support automated management of software development.

At present, a causal relation Bayesian network is a mainstream method for discovering a causal relation. It may be further divided into statistical independence-based method (for example, constraint-based method) and score-based method. However, accuracy of causal relation obtained with these two kinds of methods is generally not satisfactory.

SUMMARY

Embodiments of the present disclosure provide a method for data processing, an electronic device and a computer-readable storage medium, with which causal relations can be accurately obtained.

In a first aspect of the present disclosure, there is provided a data processing method. The method comprises obtaining a model representing causal relations among a plurality of variables based on a set of observation data of the plurality of variables. The method further comprises determining, based on the model, a first and second variables having direct causal relation in the plurality of variables. The method further comprises determining whether the first and second variables are independent from each other. The method further comprises in response to the first and second variables being independent from each other, deleting the direct causal relation between the first and second variables from the model.

In a second aspect of the present disclosure, there is provided an electronic device comprising a processor and a memory having instructions stored thereon which, when executed by the processor, cause the electronic device to perform acts of: obtaining a model representing causal relations among the plurality of variables based on a set of observation data of the plurality of variables; determining, based on the model, a first and a second variables having direct causal relation in the plurality of variables; determining whether the first and second variables are independent from each other; and in response to the first and second variables being independent from each other, deleting the direct causal relation between the first and second variables from the model.

In a third aspect, there is provided a computer-readable storage medium having computer-executable instructions stored thereon which, when executed, cause a computer to perform the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of exemplary embodiments of the present disclosure will become more apparent. In example embodiments of present disclosure, the same reference symbols usually represent the same components.

DETAILED DESCRIPTION OF EMBODIMENTS

Figure 1:
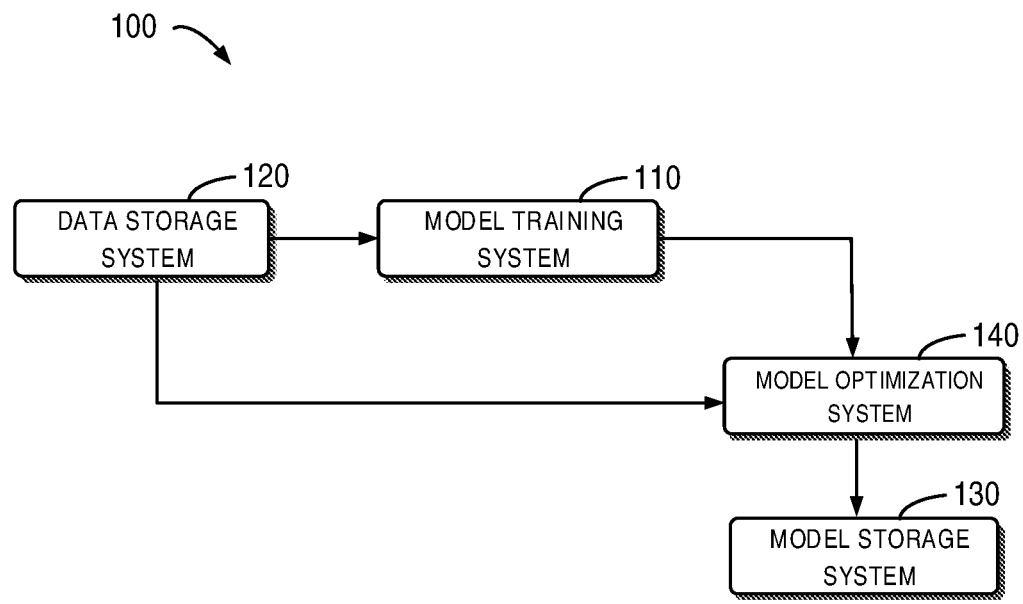
FIG. 1 is a schematic diagram illustrating an exemplary runtime environment in which embodiments of the present disclosure may be implemented.

Principles of the present disclosure may be described below with reference to several exemplary embodiments shown in the drawings. Although preferred embodiments of present disclosure are displayed in the drawings, it is to be understood that these embodiments are described only to enable those skilled in the art to better understand and further implement the present disclosure rather than to limit the scope of the present disclosure in any manner.

It is to be understood that terms "first" and "second" are only used to differentiate one element from another. As a matter of fact, the first element may also be referred to as the second element and vice versa. In embodiments of the present disclosure, term "model" generally refers to a relational structure of a certain system that is generally or approximately expressed in a mathematical language with reference to features of the system. The term "causal relation model" generally refers to a model that describes a causal relation structure of a system.

As mentioned above, in real life, it is often desired that a computer can understand internal relations existed in big data, for example, the causal relations among a plurality of factors (also referred to as "variable" in the present application) is determined based on analysis to the big data, so as to provide relevant decisions for specific fields. In a conventional scheme, causal relations among a plurality of variables are normally discovered with statistical independence-based methods and score-based methods. The statistical independence-based methods employ independence test to determine whether there is causal relation between variables and the direction of the causal relations. Representative algorithms include PC (Perter-Clark) algorithm, stable PC, PCI (Fast Causal Inference) and the like. However, the accuracy of causal relation being discovered is not ideal due to constraints of accuracy of independence test and transmissibility of determination error during the causal relation discovery process.

Score-based method may measure the degree of fitness between the observation data and the causal relation network by designing decomposable scoring criteria, and guide a search for the optimal causal network, e.g., GES (Greedy Equivalence Search), with the scoring criteria. However, since most existing scoring criteria mainly consider fitting degree of observed variables to target variables, a large amount of false causal relation is retained and therefore, the obtained accuracy of causal relation is not ideal either.

In data analysis, causal relation with low accuracy cannot provide users with proper decisions, or even mislead the users, thereby causing negative influence. Taking product retail field as an example, if two variables that have no causal relation originally are considered to have a causal relation, for example, wind is taken as a cause of sales rise of umbrellas by mistake, it would mislead umbrella retailers to increase supply of umbrellas when it is windy but does not rain, which actually will not bring any benefits.

To this end, a data processing method, an electronic device and a computer-readable storage medium is provided according to embodiments of the present disclosure, for enabling a computer to discover innate causal relations among a plurality of variables more accurately. In embodiments of the present disclosure, first of all, preliminary causal relations are obtained based on a set of observation data of a plurality of variables using, for instance, score-based causal relation learning method. Then, the preliminary causal relations are optimized using independence check and/or conditional independence check to remove pseudo-causes in the preliminary causal relations thereby obtaining optimized causal relations. Since score-based learning method and independence check-based learning method are synthesized reasonably, and a large amount of pseudo-causes induced by score-based method are eliminated using the independence check, compared with causal relations determined with a conventional method, accuracy of the optimized causal relations finally obtained in the present disclosure is higher, so that a more accurate understanding of the complex mechanism and process of actions behind the system can be obtained, potential relations between variables can be discovered and more effective decision can be provided to the users.

As described above, embodiments of the present disclosure may be applied to the product retail field, health care field, and software development field. However, embodiments of the present disclosure are not limited to the above-mentioned fields, but can be applied to any data processing and analyzing fields that enable a computer to understand causal relations contained in data.

In the following, reference will be made to FIGS. 1 to 6 to describe the solution of the present disclosure for determining the causal relations among a plurality of variables. However, it is to be noted that this description is only for the purpose of illustration and the present disclosure is not limited to these embodiments and details in the drawings.

FIG. 1 is a schematic diagram illustrating a runtime environment 100 in which embodiments of the present disclosure may be implemented. It is to be understood that the environment 100 shown in FIG. 1 is only an example in which embodiments of the present disclosure may be implemented, without limiting the application environment and scenario of the present disclosure. Embodiments of the present disclosure are also applicable to other environment or architecture.

As shown in FIG. 1, the environment 100 may include a data storage system 120. The data storage system 120 is used for storing a set of observation data X ($X \in R^{N \times D}$) of a plurality of variables, which may be represented as an N*D matrix, where N is the number of observed samples and D is the number of dimensions of observed variables or number of the observed variables. Taking the product retail field as an example, it is assumed that the observed variables are season, temperature, humidity, weather (for example, whether it rains), sales volume of umbrella, sales volume of ice cream and sales volume of sunscreen cream, then the number D of the observed variables is 7. Assuming that these variables are observed for thirty days, then the number N of the observed samples is 30 and the observed samples of the $i^{th}$ day ($1 \leq i \leq 30$) are consist of the season of the day, the temperature of the day, whether it rains that day, the sales volume of umbrella that day, the sales volume of ice cream that day and the sales volume of sunscreen cream that day.

Data in the set X of observation data may be data from a third party (e.g., sales website, weather forecast provider and so on) or the data may be collected in other ways. Besides, the data may be pre-processed in advance, for example, pre-processing like integration, specification, and noise reduction and so on to raw data. These pre-processing operations per se are already known in the art and will not be repeated herein.

The environment 100 may further include a model training system 110 which receives a set X of observation data of a plurality of observed variables from the data storage system 120. The model training system 110 may obtain a preliminary model (also referred to as a preliminary causal relation model below) representing causal relations among a plurality of variables based on the set of observation data using an existing technology e.g., score-based Bayesian causal relation network or other causal relation discovery technology. For example, the preliminary causal relation model may be generated through training based on the set of observation data.

Figure 2:
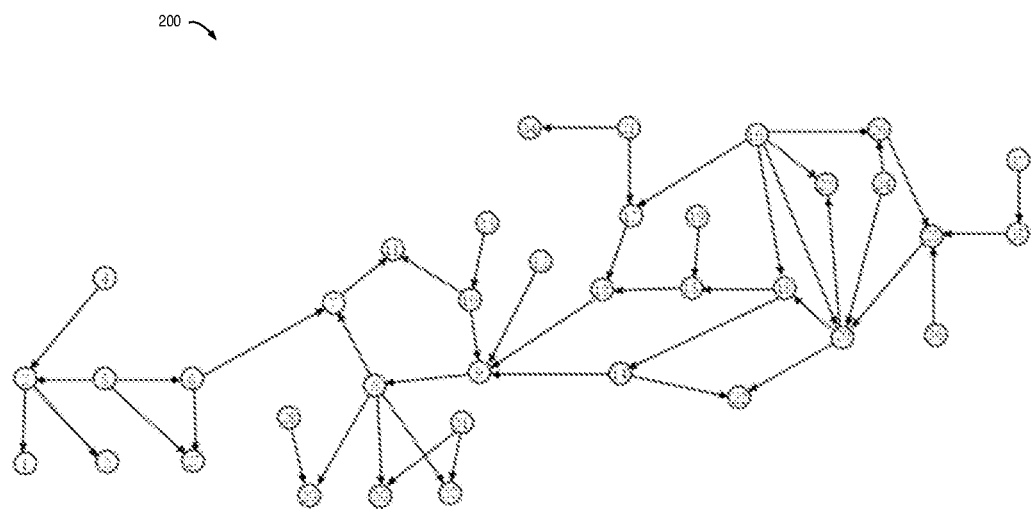
FIG. 2 illustrates an initial causal relation model obtained with a model training system in FIG. 1.

FIG. 2 illustrates a preliminary causal relation model 200 obtained with the model training system 110. As shown in FIG. 2, the preliminary causal relation model 200 is represented as a directed acyclic graph in which the nodes represent a plurality of variables and a directed edge between two nodes denotes the existence of direct causal relation between the two nodes and the direction of the causal relation, for example, the source node is a direct cause of the target node. It is to be understood that the directed acyclic graph is only an exemplary representation of causal relation and embodiments of the present disclosure are not limited in this regard. Those skilled in the art may represent the causal relation in other manners according to an actual application. The causal relation model 200 shown in FIG. 2 represents the causal relations among 37 variables. It is to be understood that 37 is only an illustrative number of variables and the number of variables may be any integer greater than 1 based on an actual application. As shown in FIG. 2, there is a directed edge between node 5 and node 6, indicating that the variable represented by the node 5 is a direct cause of the variable represented by the node 6 and the variable represented by the node 6 is a direct result of the variable represented by the node 5, that is, there is a direct causal relation between the two variables.

As stated above, since most of the scoring criteria adopted by the score-based method mainly consider fitting degree of the observed variable to the target variable to select causes for target variables, a large amount of false causal relations are retained. As a result, the preliminary causal relation model 200 obtained with the model training system 110 is generally not accurate enough. Therefore, according to embodiments of the present disclosure, the environment 100 may further include a model optimization system 140 which receives the preliminary causal relation model 200 from the model training system 110 and determines variables having direct causal relations based on the causal relation model 200, e.g., variables 5 and 6, variables 6 and 27, variables 13 and 9 and so on, as shown in FIG. 2.

Furthermore, the model optimization system 140 may determine whether two variables having direct causal relations are independent or conditionally independent based on a statistical method (in embodiments of the present disclosure, independence and conditional independence are collectively referred to as independence). For two variables being determined as independent, the model optimization system 140 may delete the direct causal relation between the two variables from the preliminary causal relation model. The model optimization system 140 may repeat the above process for each direct causal relation in the preliminary causal relation model, so as to obtain an optimized causal relation model and output it, for example, storing in a model storage system 130 for subsequent use. For example, when an automated decision-making is performed with a computer, the optimized model may be obtained from the model storage system 130 and data analysis may be performed based on this model to provide a proper decision. For example, in the above product retail field, the optimized casualty model may formulate strategies automatically for a user, or assist the user in formulating strategies for improving sales volume of umbrella or ice cream or sunscreen cream.

It is to be understood that although the model training system 110, the model optimization system 140, the data storage system 120 and the model storage system 130 are shown as separated from each other in FIG. 1, embodiments of the present disclosure are not limited in this regard. Based on an actual application, the model training system 110 and model optimization system 140 may be integrated, and the data storage system 120 and model storage system 130 may also be integrated.

Figure 3:
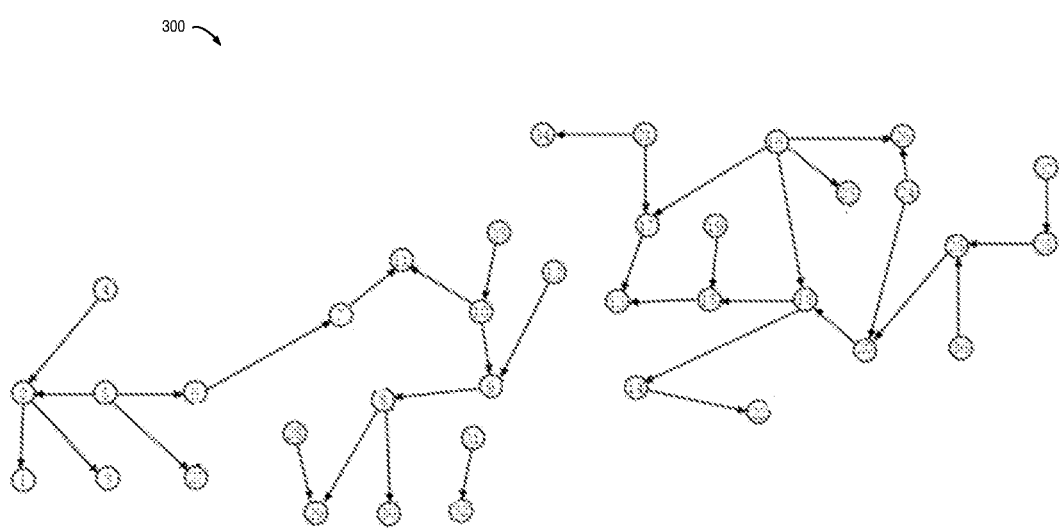
FIG. 3 illustrates an optimized causal relation model outputted by a model optimization system in FIG. 1.

FIG. 3 illustrates an optimized causal relation model 300 outputted by the model optimization system 140. Compared with the preliminary causal relation model 200 shown in FIG. 2, in the optimized causal relation model 300 shown in FIG. 3, since the variables 6 and 27 are independent, the edge between the variables 6 and 27 is deleted. In probability and statistics, random variables X and Y being independent means that the occurrence of the variable Y will not influence the variable X, that is, the variable Y will not be the cause of the variable X, or the variable X will not be the effect of the variable Y, and vise verse. Therefore, if two variables having direct causal relation in the preliminary causal relation model 200 are independent from each other, the direct causal relation between the two variables in the model 200 is indeed statistically false (namely, pseudo-cause), and should be deleted. The model optimization system 140 actually deletes pseudo-causes exactly based on this principle so that the causal relation represented by the optimized causal relation model 300 outputted by the model optimization system 140 is more accurate.

On the other hand, since the model optimization system 140 performs independence check for variables having direct causal relation based on the preliminary causal relation model 200 outputted by the model training system 110 rather than performing independence check for any two among the plurality of variables, it can save computational resources and improve computing speed while improving accuracy.

Figure 4:
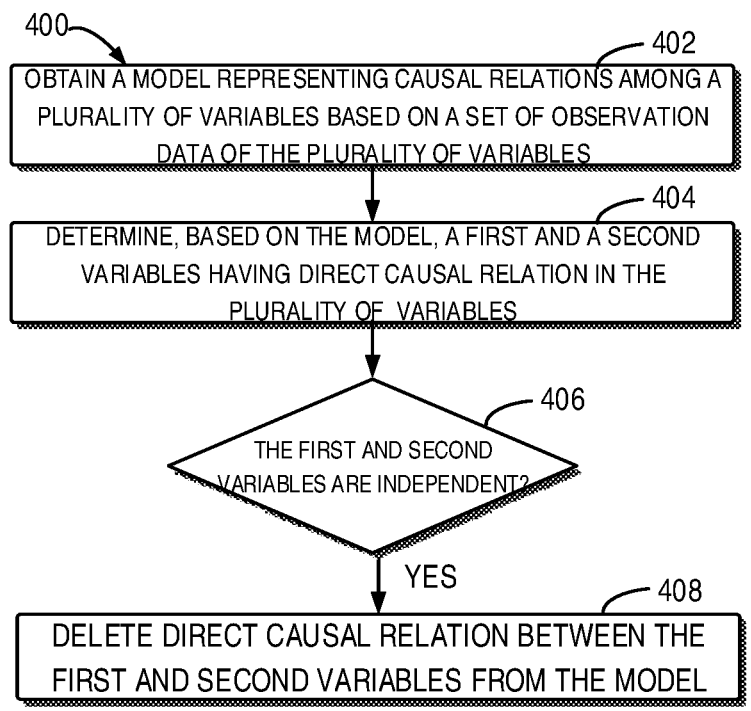
FIG. 4 illustrates a flowchart of a data processing method in accordance with embodiments of the present disclosure.

FIG. 4 is a flowchart illustrating a processing method 400 for determining causal relations among a plurality of variables in accordance with embodiments of the present disclosure. Method 400 may be performed by the model training system 110 and model optimization system 140 shown in FIG. 1 jointly.

At block 402, the model training system 110 obtains a model representing causal relations among a plurality of variables, namely, a preliminary causal relation model, based on a set of observation data of the plurality of variables. As described above, the set of observation data of the plurality of variables may be from a variety of sources. In the product retail field mentioned above, the set of observation data may be from a retail website, a weather forecast provider and so on, or may be obtained by other means.

In an embodiment of the present disclosure, the model training system 110 may obtain a preliminary causal relation model using various technologies. For ease of depiction, a score-based Bayesian network will be used as an example to describe the specific process for the model training system 110 to obtain a preliminary causal relation model. However, those skilled in the art shall appreciate that embodiments of the present disclosure are not limited to the score-based Bayesian network described herein, and the model training system 110 may also employ other existing or forthcoming causal relation discovering learning technologies to obtain the preliminary causal relation model.

It is assumed that there are p variables, the following matrix B may be used to show the causal relations among the p variables:

$$B = \begin{bmatrix} \beta_{1,1} & \cdots & \beta_{1,p} \\ \vdots & \ddots & \vdots \\ \beta_{p,1} & \cdots & \beta_{p,p} \end{bmatrix}$$

where the matrix B is a p-order matrix containing p×p elements, and each element represents whether there is direct causal relation between two variables corresponding to the positions of the elements. Specifically, a variable $\beta_{ji}$ in the matrix B represents a direct cause relation between the $j^{th}$ variable and the $i^{th}$ variable among p variables. For example, the variable $\beta_{ji}$ in the matrix B represents whether variable i is a direct cause of variable j. Speaking concretely, if $|\beta_{ji}|>0$, then variable i is a direct cause of variable j. It is to be noted that different order of two variables represents different causal relations. Thus, $\beta_{ji}$ and $\beta_{ij}$ represent different causal relationships. In other words, the directions of edges in the directed graph represented by the matrix B are different. Moreover, a diagonal part in the matrix B represents the causal relation between each element and itself. Since there is no causal relation between specific elements with themselves, the values of the elements at the diagonal part should be set to 0.

As such, in a Bayesian network, the problem of determining causal relations among p variables based on a set of observation data may be converted into a solution process for the matrix B describing the causal relations among a plurality of elements.

Scoring criteria associated with causal relation may be defined based on a set of observation data and the above matrix B. For example, fitting degree of the set of observation data to the causal relation network may be determined as the scoring criteria based on the following equation:

$$\sum_{j=1}^{p} \|x_j - x'_{-j}\beta_j\|_2^2 + \lambda \sum_{j=1}^{p} \|\beta_j\|_1$$

where $\beta j$ represents the $j^{th}$ row of the matrix B, $x_3$ denotes the observation data of the $j^{th}$ variable, $x_j$ represents the observation data of variables apart from the $j^{th}$ variable, represents L2-Norm operation, and $\| \|_1$ represents L1-Norm operation.

Then, a problem equation describing a causal relation is constructed based on scoring criteria:

$$\min_{\beta_1,\dots,\beta_p} \sum_{j=1}^{p} \|x_j - x'_{-j}\beta_j\|_2^2 + \lambda \sum_{j=1}^{p} \|\beta_j\|_1 \text{ s.t. } G \in DAG$$

where a constraint is that graph structure G should not contain a directed cyclic graph. In other words, the graph structure G should be a directed acyclic graph.

Next, the matrix B representing causal relations may be obtained by solving the problem equation. For example, the matrix B may be solved with a search algorithm described in the article A* Lasso for learning a sparse Bayesian network structure for continuous variables (NIPS, 2013) by Jing Xiang, Seyoung Kim et al. so as to obtain the preliminary causal relation model.

It should be understood that the scoring criteria, problem equation and solution of the problem equation described herein are only exemplary, and embodiments of the present disclosure are not limited in this regard. Those skilled in the art may define other scoring criteria and problem equation and utilize other search algorithms to solve the problem equation based on actual needs.

At block 404, the model optimization system 140 determines a first and a second variables having direct causal relation among the plurality of variables based on the preliminary causal relation model obtained at block 402. In one embodiment of the present disclosure, where the causal relation model is represented as the directed acyclic graph 200 shown in FIG. 2, the model optimization system 140 may traverse the directed acyclic graph 200 with graph traversing algorithm to determine directed edges in the directed acyclic graph 200 so as to determine two variables associated with the directed edges, namely, the two variables having a direct causal relation. More specifically, when the causal relation model is represented as the matrix B mentioned above, the model optimization system 140 may determine two variables having direct causal relation by looking up non-zero elements in the matrix B. For example, if $\beta_{ji}$ is non-zero, it can be determined that variables j and i are two variables having a direct causal relation.

At block 406, the model optimization system 140 determines whether the first and second variables are independent based on the set of observation data. Statistically, Independence between two random variables denotes refers to that the occurrence probabilities of the two variables do not influence each other. That is, if the probability that the first and second variables occur simultaneously equals to a product of their respective occurrence probability, the first and second variables are independent from each other. In most cases, variables influence each other more or less, while normally this kind of influence relies on other variables instead of being generated directly. To this end, in embodiments of the present disclosure, the model optimization system 140 may further determine whether the first and second variables are conditionally independent under a certain condition. Statistically, conditional independence between two random variables means that the occurrence probabilities of the two variables do not influence each other under the occurrence of other variables. How to determine whether the first and second variables are independent from each other will be described in detail later with reference to FIG. 5.

At block 408, in response to the first and second variables being independent from each other, the model optimization system 140 deletes the direct causal relation between the first and second variables from the preliminary causal relation model. When the causal relation model is represented as the directed acyclic graph 200 shown in FIG. 2, the model optimization system 140 may delete the edge between the node representing the first variable and the node representing the second variable from the directed acyclic graph 200. More specifically, where the causal relation model is represented as the matrix B mentioned above, the model optimization system 140 may set the element in the matrix B associated with the first and second variables as 0. As shown in FIGS. 2 and 3, the edge between node 6 and node 27, the edge between node 8 and node 32, the edge between node 31 and node 30, and the edge between node 16 and node 20 and so on are deleted because of independence or conditional independence between nodes, thereby obtaining the optimized causal relation model as shown in FIG. 3 in which pseudo-causes are removed. As can be known from definitions of independence and conditional independence of two random variables, two variables being independent or conditionally independent denotes that the occurrence probabilities of the two variables do not influence each other, namely, the occurrence of one variable does not influence the occurrence of the other. In other words, if two variables are independent or conditionally independent, it demonstrates that one of the two variables cannot be the cause or effect of the other. Thus, in the obtained preliminary causal relation model at block 402, if the first and second variables having direct causal relation are independent or conditionally independent, it means that the direct causal relation between these two variables is not true, namely, pseudo-cause. Therefore, deleting the pseudo-cause from the preliminary causal relation model will make the model more accurate.

The operations described in blocks 404, 406 and 408 are repeated so as to delete all the direct causal relation determined as pseudo-cause from the preliminary causal relation model, thereby obtaining a more accurate optimized causal relation model which is outputted for subsequent data analysis, e.g., automated or semi-automated decision-making.

Figure 5:
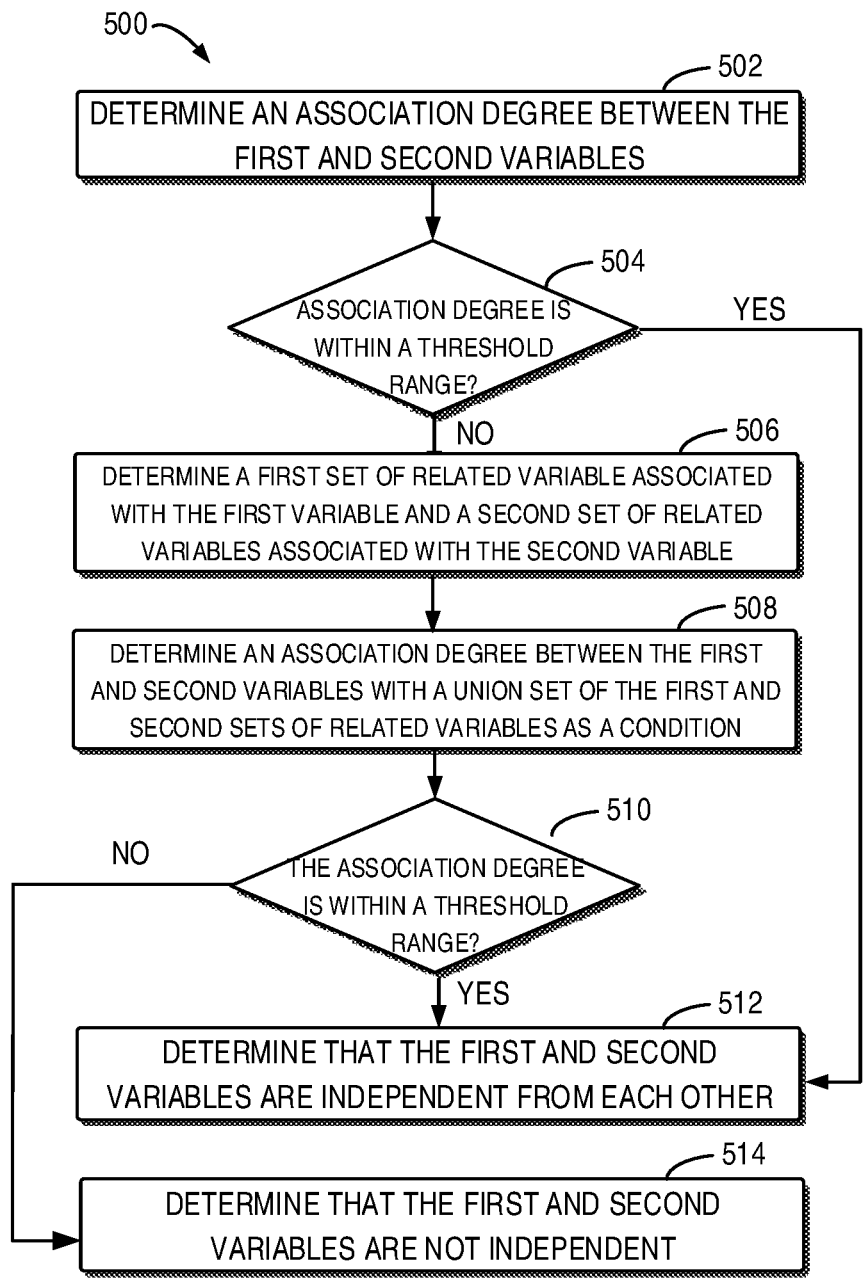
FIG. 5 illustrates a flowchart of a method for determining whether two variables are independent in accordance with embodiments of the present disclosure.

FIG. 5 is a flowchart illustrating a method 500 for determining whether two variables are independent in accordance with embodiments of the present disclosure. The method 500 may be performed by the model optimization system 140 shown in FIG. 1. At block 502, the model optimization system 140 may determine an association degree between the first and second variables based on a set of observation data. In embodiments of the present disclosure, the association degree may be used as a measurement of the relationship between the probability of co-occurrence of the first and second variables and the probability that two variables occur separately.

In an embodiment of the present disclosure, to determine the association degree, the model optimization system 140 may determine types of the first and second variables and select an independence decision method based on the determined types. For example, in the example of the product retail field mentioned above, variables "season" and "weather" are discrete variables while variables "temperature," "weather," "sales volume of umbrella," "sales volume of ice cream" and "sales volume of sunscreen cream" are continuous variables. Based on the types of the first and second variables, the corresponding calculation method of the association degree may be adopted so as to ensure the feasibility of calculation and improve accuracy of calculation.

In an embodiment of the present disclosure, in response to both the first and second variables being continuous variables, the model optimization system 140 may employ a continuous independence decision method such as Pearson correlation test to determine the association degree between the first and second variables. For example, based on the observation data associated with the first variable and the observation data associated with the second variable, a Pearson correlation coefficient between the two variables is calculated as the association degree.

In an embodiment of the present disclosure, in response to both the first and second variables being discrete variables, the model optimization system 140 may determine the association degree between the first and second variables by adopting a discrete independence decision method such as chi-square test. For example, the deviation degree between the value inferred from the assumption that the first and second variables are independent and the actual value of a set of observation data may be used as the association degree between the first and second variables.

In one embodiment of the present disclosure, in response to one of the first and second variables being a discrete variable while the other being a continuous variable, the model optimization system 140 may adopt a hybrid independence check method such as GP-HSIC (Gaussian process-Hilbert-Schmidt independence criterion) to determine the association degree between the first and second variables.

At block 504, the model optimization system 140 may determine whether the association degree between the first and second variables is within a first threshold range. The selection of the first threshold range depends on the specific application and the independence decision method in use. In one embodiment of the present disclosure, it may be predefined. If the association degree is within the first threshold range, for example, the Pearson correlation coefficient between two continuous variables is less than the first threshold, it means that the first and second variables are unconditionally independent. In this light, in response to the association degree being within the first threshold range, at block 512, the model optimization system 140 may determine that the first and second variables are independent.

In embodiments of the present disclosure, to eliminate more pseudo-causes that are not helpful in actual application, when the first and second variables are not unconditionally independent, the model optimization system 140 may further determine whether the first and second variables are conditionally independent. To this end, in response to the association degree exceeding the first threshold range, at block 506, the model optimization system 140 may determine a first set of related variables associated with the first variable and a second set of related variables associated with the second variable.

In one embodiment of the present disclosure, when the causal relation model is represented as the directed acyclic graph 200 shown in FIG. 2, the model optimization system 140 may determine a set of parent nodes and spouse nodes of the first variable as the first set of related variables, and the model optimization system 140 may determine a set of the parent nodes and spouse nodes of the second variable as the second set of related variables. As shown in FIG. 2, the parent nodes of node 8 is node 7 and node 9, the spouse nodes of node 8 (namely, nodes having the same child node as node 8) is node 28 and node 31, and thus, the variable set associated with the node 8 is {node 7, node 9, node 28, and node 31}.

In one embodiment of the present disclosure, Markov blanket sets of the first and second variables may be determined based on a set of observation data, respectively and used as the first and second sets of related variables, respectively. The Markov blanket set for a variable X may be defined as follows: assuming that a complete set U of random variables is divided into three mutually exclusive parts-variable X and set A and set B, which do not intersect and whose union set is U. If when the set A is given, the variable X and set B are unrelated, and then the set A is a Markov blanket set of variable X. In embodiments of the present disclosure, Markov blanket learning technology that is already known in the art may be used to determine the Markov blanket sets for the first and second variables, which will not be repeated here.

At block 508, the model optimization system 140 may determine an association degree between the first and second variables with a union set of the first and second sets of related variables as a condition, which may be abbreviated as conditional association degree in the following.

Similar to the block 502, to realize the determination of conditional association degree and improve accuracy, the model optimization system 140 may select the conditional independence decision method based on types of the first variable, the second variable and the conditional variable in the union set. For example, if the first variable, the second variable and the conditional variable are all continuous variables, then the model optimization system 140 may select a continuous conditional independence decision method, for example, a partial correlation test, and calculate, under the condition of union set of the first and second sets of related variables, the partial correlation measurement of the first and second variables as conditional association degree.

When the first variable, the second variable and the conditional variable are all discrete variables, the model optimization system 140 may select a discrete decision method (for example, a chi-square test) to determine the conditional association degree. For example, the deviation degree between the assumed value inferred under the condition that the first and second variables are conditionally independent (with the union set of the first and second sets of related variables as a condition) and the actual value may be used as the conditional association degree.

When there are both a discrete variable and a continuous variable among the first variable, the second variable and the conditional variable, the model optimization system 140 may select a hybrid check method (such as GP-HSIC or PCI-Permute (Permutation-based Kernel conditional Independence Test)) to determine the conditional association degree.

At block 510, the model optimization system 140 may determine whether the conditional association degree is within a second threshold range. The second threshold range may be the same as or different from the first threshold and it also depends on actual application and the independence decision method in use, and may be predefined. At block 512, in response to the conditional association degree being within the second threshold range, the model optimization system 140 may determine that the first and second variables are independent from each other. At block 514, in response to the conditional association degree exceeding the second threshold range, the model optimization system 140 may determine that the first and second variables are not independent.

In the method 500 shown in FIG. 5, it is first determined at blocks 502 and 504 whether the first and second variables are statistically unconditionally independent. In response to the first and second variables not being unconditionally independent, it is determined at blocks 506, 508 and 510 whether the two variables are statistically conditionally independent. In this manner, more pseudo-causes may be deleted from the causal relation model.

On the other hand, only when the two variables are not unconditionally independent, it is further determined whether they are conditionally independent so as to save computation resources and time required for determining the set of related variables. For each direct causal relation in the preliminary causal relation model (for example, each edge in the directed acyclic graph shown in FIG. 2), method 500 is repeated so that all the pseudo-causes in the preliminary causal relation model can be found and deleted, thereby obtaining the optimized causal relation model as shown in FIG. 3. This optimized causal relation model may be further used for follow-up data analysis.

Compared with the conventional score-based causal relation discovering method and statistical independence-based causal relation discovering method, embodiments of the present disclosure can provide a more accurate causal relation model so as to gain an insight into the complex working mechanism and working process behind a system and provide more effective decisions to a user.

Figure 6:
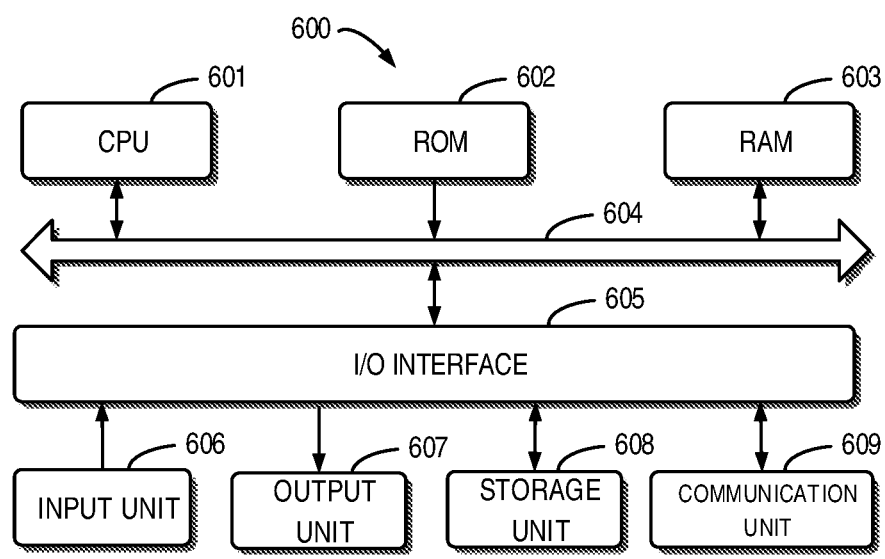
FIG. 6 is a schematic block diagram of an exemplary device that may be used to implement embodiments of the present disclosure.

FIG. 6 is a schematic block diagram illustrating an exemplary device 600 that may be used to implement embodiments of the present disclosure. The device 600 may be used to implement both the model training system 110 and model optimization system 140 shown in FIG. 1. As shown in FIG. 6, the device 600 includes a central processing unit (CPU) 601 which may execute various appropriate actions and processing based on the computer program instructions stored in a read-only memory (ROM) 602 or the computer program instructions loaded into a random access memory (RAM) 603 from a storage unit 608. The RAM 603 may store various kinds of programs and data required by operating the storage device 600. The CPU 601, ROM 602 and RAM 603 are connected to each other via a bus 604. An input/output (I/O) interface 605 is also connected to the bus 604.

A plurality of components in the device 600 are connected to the I/O interface 605, including: an input unit 606, for example, an keyboard, a mouse and the like; an output unit 607, for example, various types of displays, loudspeakers and the like; a storage unit 608, for example, a magnetic disk, an optical disk and the like; and a communication unit 609, for example a network card, a modem, a wireless communication transceiver and the like. The communication unit 609 allows the device 600 to exchange information/data with other devices through computer networks such as Internet and/or various telecommunication networks.

The processing unit 601 performs various methods and processing described above, for example, the method 400 and/or the method 500. For example, in some embodiments, the method 400 and/or the method 500 may be implemented as computer software programs, which are tangibly included in a machine-readable medium, for example the storage unit 608. In some embodiments, the computer program may be partially or completely loaded and/or installed to the device 600 via the ROM 602 and/or the communication unit 609. When the computer program is loaded to the RAM 603 and executed by the CPU 601, one or more steps of the above described method 400 and/or method 500 are implemented. Alternatively, in other embodiments, the CPU 601 may be configured to implement the method 400 and/or the method 500 in any other suitable manners (for example, by means of firmware).

The functionally described herein may be performed, at least in part, by one or more hardware logic components. For example, without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), and the like.

Program code for carrying out methods of the subject matter described herein may be written in any combination of one or more programming languages. These program codes may be provided to a processor or a controller of a general purpose computer, special purpose computer, or other programmable data processing apparatus, such that the program codes, when executed by the processor or the controller, cause the functions/operations specified in the flowcharts and/or block diagrams to be implemented. The program code may be executed entirely on a machine, partly on the machine, as a stand-alone software package, partly on the machine and partly on a remote machine or entirely on the remote machine or server.

In the context of the subject matter described herein, a machine readable medium may be any tangible medium that may contain, or store a program for use by or in connection with an instruction execution system, an apparatus, or a device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:

1. A data processing method, comprising:
    upon performing an automated decision-making, obtaining, by a computer, a preliminary model representing causal relations among a plurality of variables, wherein the preliminary model is generated using a computer training method and using a set of observation data of the plurality of variables retrieved from a data storage system, and wherein the preliminary model comprises directed edges representing causal relations between the plurality of variables;
    determining, by the computer, using the preliminary model, a first variable and a second variable having direct causal relation in the plurality of variables; and
    generating, by the computer, an optimized model representing causal relations among the plurality of variables by operations comprising:
        determining, by the computer, whether the first variable and the second variable are independent from each other using an independence check computer analyzing method and using the preliminary model, wherein the determining whether the first variable and the second variable are independent from each other comprises:
            determining, by the computer from the plurality of variables, a first set of related variables associated with the first variable and a second set of related variables associated with the second variable;
            determining, by the computer using the set of observation data, an association degree between the first variable and the second variable with a union set of the first set of related variables and the second set of related variables as a condition; and
            in response to the association degree being within a threshold range, determining that the first variable and the second variable are independent from each other; and
        in response to the first variable and the second variable being independent from each other, deleting from the preliminary model, the direct causal relation between the first variable and the second variable to obtain the optimized model which is outputted for the automated decision-making.

2. The method according to claim 1, wherein the determining whether the first variable and the second variable are independent from each other comprises:
    determining, using the set of observation data, an association degree between the first variable and the second variable; and
    in response to the association degree being within a threshold range, determining that the first variable and the second variable are independent from each other.

3. The method according to claim 2, wherein the determining the association degree between the first variable and the second variable comprises:
    selecting an independence decision method using a type of the first variable and a type of the second variable; and
    determining the association degree between the first variable and the second variable using the selected independence decision method.

4. The method according to claim 3, wherein the selecting the independence decision method comprises: in response to both the first variable and the second variable being discrete variables, selecting a discrete independence decision method; in response to both the first variable and the second variable being continuous variables, selecting a continuous independence decision method; and in response to one of the first variable and the second variable being a discrete variable and the other variable being a continuous variable, selecting an independence decision method of hybrid check.

5. The method according to claim 1, wherein the determining the first set of related variables and the second set of related variables comprises:
    determining, using the set of observation data, a Markov blanket set for the first set of related variables and a Markov blanket set for the second set of related variables using a Markov blanket learning technology.

6. The method according to claim 1, wherein the preliminary model comprises a directed acyclic graph with nodes representing the plurality of variables, and
    wherein the determining the first set of related variables and the second set of related variables comprises:
    determining a set of parent nodes and spouse nodes for a first node representing the first variable in the directed acyclic graph, as the first set of related variables; and
    determining a set of parent nodes and spouse nodes for a second node representing the second variable in the directed acyclic graph, as the second set of related variables.

7. The method according to claim 1, wherein the determining the association degree between the first variable and the second variable with the union set of the first set of related variables and the second set of related variables as a condition comprises:
    selecting an independence decision method using a type of the first variable, a type of the second variable, and a type of a conditional variable in the union set; and determining the association degree between the first variable and the second variable using the selected independence decision method with the union set as a condition.

8. The method according to claim 7, wherein the selecting the independence decision method comprises: in response to the first variable, the second variable, and conditional variable being discrete variables, selecting a discrete independence decision method; in response to the first variable, the second variable, and the conditional variable being continuous variables, selecting a continuous independence decision method; and in response to both a discrete variable and a continuous variable being present among the first variable, the second variable, and the conditional variable, selecting an independence decision method of hybrid check.

9. The method according to claim 1, wherein the obtaining the preliminary model comprises:
obtaining the preliminary model using a score-based causal relation Bayesian network.

10. The method according to claim 1, further comprising performing, by at least one processor, automated decision-making using the generated optimized model.

11. An electronic device, comprising:
at least one processor; and
a memory having instructions stored thereon which, if executed by the processor, cause the electronic device to perform a method comprising:
upon performing an automated decision-making, obtaining a preliminary model representing causal relations among a plurality of variables, wherein the preliminary model is generated using a computer training method and using a set of observation data of the plurality of variables retrieved from a data storage system, and wherein the preliminary model comprises directed edges representing causal relations between the plurality of variables;
determining, by the at least one processor, using the preliminary model, a first variable and a second variable having direct causal relation in the plurality of variables; and
generating, by the at least one processor, an optimized model representing causal relations among the plurality of variables by operations comprising:
determining, by the at least one processor, whether the first variable and the second variable are independent from each other using an independence check computer analyzing method and using the generated preliminary model, wherein the determining whether the first variable and the second variable are independent from each other comprises:
determining, by the at least one processor, from the plurality of variables, a first set of related variables associated with the first variable and a second set of related variables associated with the second variable;
determining, by the at least one processor, using the set of observation data, an association degree between the first variable and the second variable with a union set of the first set of related variables and the second set of related variables as a condition; and
in response to the association degree being within a threshold range, determining that the first variable and the second variable are independent from each other; and
in response to the first variable and the second variable being independent from each other, deleting from the preliminary model, by the computer, the direct causal relation between the first variable and the second variable to obtain the optimized model which is outputted for the automated decision-making.

12. The electronic device according to claim 11, wherein the determining whether the first variable and the second variable are independent from each other comprises:
determining, using the set of observation data, an association degree between the first variable and the second variable; and
in response to the association degree being within a threshold range, determining that the first variable and the second variable are independent from each other.

13. The electronic device according to claim 12, wherein the determining the association degree between the first variable and the second variable comprises:
selecting an independence decision method using a type of the first variable and a type of the second variable; and
determining the association degree between the first variable and the second variable using the selected independence decision method.

14. The electronic device according to claim 13, wherein the selecting the independence decision method comprises: in response to both the first variable and the second variable being discrete variables, selecting a discrete independence decision method; in response to both the first variable and the second variable being continuous variables, selecting a continuous independence decision method; and in response to one of the first variable and the second variable being a discrete variable and other variable being a continuous variable, selecting an independence decision method of hybrid check.

15. The electronic device according to claim 11, wherein the determining the first set of related variables and the second set of related variables comprises:
determining, using the set of observation data, a Markov blanket set for the first set of related variables and a Markov blanket set for the second set of related variables using a Markov blanket learning technology.

16. The electronic device according to claim 11, wherein the preliminary model comprises a directed acyclic graph with nodes representing the plurality of variables, and
wherein the determining the first set of related variables and the second set of related variables comprises:
determining a set of parent nodes and spouse nodes for a first node representing the first variable in the directed acyclic graph as the first set of related variables; and
determining a set of parent nodes and spouse nodes for a second node representing the second variable in the directed acyclic graph, as the second set of related variables.

17. The electronic device according to claim 11, wherein the determining the association degree between the first variable and the second variable with the union set of the first set of related variables and the second set of related variables as a condition comprises:
selecting an independence decision method using a type of the first variable, a type of the second variable, and a type of a conditional variable in the union set; and
determining the association degree between the first variable and the second variable using the selected independence decision method with the union set as a condition.

18. The electronic device according to claim 17, wherein the selecting the independence decision method comprises: in response to the first variable, the second variable and conditional variable being discrete variables, selecting a discrete independence decision method; in response to the first variable, the second variable and the conditional variable being continuous variables, selecting a continuous independence decision method; and in response to both a discrete variable and a continuous variable being present among the first variable, the second variable and the conditional variable, selecting an independence decision method of hybrid check.

19. The electronic device according to claim 11, wherein the obtaining the preliminary model comprises:
obtaining the preliminary model using a score-based causal relation Bayesian network.

20. A non-transitory computer-readable storage medium having computer-executable instructions stored thereon, the computer-executable instructions, if executed, causing a computer to perform a method comprising:
upon performing an automated decision-making, obtaining a preliminary model representing causal relations among a plurality of variables, wherein the preliminary model is generated using a computer training method and using a set of observation data of the plurality of variables retrieved from a data storage system, and wherein the preliminary model comprises directed edges representing causal relations between the plurality of variables;
determining, by the computer, using the generated preliminary model, a first variable and a second variable having direct causal relation in the plurality of variables; and
generating, by the computer, an optimized model representing causal relations among the plurality of variables by operations comprising:
determining, by the computer, whether the first variable and the second variable are independent from each other using an independence check computer analyzing method and using the generated preliminary model, wherein the determining whether the first variable and the second variable are independent from each other comprises:
determining, by the computer, from the plurality of variables, a first set of related variables associated with the first variable and a second set of related variables associated with the second variable;
determining, by the computer, using the set of observation data, an association degree between the first variable and the second variable with a union set of the first set of related variables and the second set of related variables as a condition; and
in response to the association degree being within a threshold range, determining that the first variable and the second variable are independent from each other; and
in response to the first variable and the second variable being independent from each other, deleting from the preliminary model, by the computer, the direct causal relation between the first variable and the second variable to obtain the optimized model which is outputted for the automated decision-making.

\* \* \* \* \*